(12) United States Patent
Emeott (10) Patent No.: US 9,098,923 B2
(45) Date of Patent: Aug. 4, 2015

(54) DETECTION OF LONG SHOTS IN SPORTS VIDEO

(71) Applicant: General Instrument Corporation, Horsham, PA (US)

(72) Inventor: Stephen P Emeott, Rolling Meadows, IL (US)

(73) Assignee: General Instrument Corporation, Horsham, PA (US)

( * ) Notice: Subject to any disclaimer, the term of this patent is extended or adjusted under 35 U.S.C. 154(b) by 48 days.

(21) Appl. No.: 13/842,056

(22) Filed: Mar. 15, 2013

(65) Prior Publication Data

US 2014/0270501 A1    Sep. 18, 2014

(51) Int. Cl.
*G06K 9/00* (2006.01)
*G06T 7/40* (2006.01)

(52) U.S. Cl.
CPC ...................................... *G06T 7/408* (2013.01)

(58) Field of Classification Search
CPC ............. G06K 9/00711; G06T 7/2006; H04N 19/00575; H04N 5/144; H04N 5/145
USPC ......... 382/107, 162, 164, 165, 181, 295, 284, 382/274; 386/241; 375/240.16
See application file for complete search history.

(56) References Cited

U.S. PATENT DOCUMENTS

| | | |
|---|---|---|
| 2002/0018594 A1 | 2/2002 | Xu et al. |
| 2003/0063798 A1 | 4/2003 | Li et al. |
| 2004/0130567 A1 | 7/2004 | Ekin et al. |
| 2005/0063464 A1* | 3/2005 | Shives et al. ............. 375/240.12 |
| 2012/0114184 A1* | 5/2012 | Barcons-Palau et al. ..... 382/107 |
| 2012/0263437 A1* | 10/2012 | Barcons-Palau et al. ..... 386/241 |

OTHER PUBLICATIONS

A. Ekin, et al., "Automatic Soccer Video Analysis and Summarization", IEEE Transactions on Image Processing, vol. 12, No. 7, Jul. 7, 2003, pp. 796-807.
P. Xu, et al., "Algorithms and System for Segmentation and Structure Analysis in Soccer Video", IEEE International Conference on Multimedia and Expo, 2001 ICME 2001, Aug. 22-25, 2001, pp. 721-724.
Y. Liu, et al., "Playfield Detection Using Adaptive GMM and Its Application", IEEE International Conference on Acoustics, Speech, and Signal Processing, 2005 Proceedings (ICASSP '05), Mar. 18-23, 2005, pp. 421-424.

(Continued)

*Primary Examiner* — Ali Bayat
(74) *Attorney, Agent, or Firm* — Thomas A. Ward (57) ABSTRACT

A method of identifying long shots of sports video comprising receiving a video frame comprising a plurality of pixels, classifying each of the plurality of pixels as a candidate field pixel or a candidate non-field pixel, determining whether at least a predefined percentage of the plurality of pixels are candidate field pixels, calculating a first standard deviation, the first standard deviation being the standard deviation of the hues of all candidate field pixels, and classifying the video frame as a long shot of sports video when at least the predefined percentage of the plurality of pixels are candidate field pixels and the first standard deviation is equal to or lower than a predefined maximum standard deviation value.

17 Claims, 8 Drawing Sheets

(56) References Cited

OTHER PUBLICATIONS

L. Wang, et al., "Automatic Extraction of Semantic Colors in Sports Video", IEEE International Conference on Aucoustics, Speech, and Signal Processing, 2004 (ICASSP '04), May 17-21, 2004, pp. 617-620.

S. Jiang, et al., "A New Method to Segment Playfield and its Applications in Match Analysis in Sports Video", Multimedia '04 Proceedings of the 12th annual ACM international conference on Multimedia, Oct. 10-16, 2004, pp. 292-295.

S. Pei, et al., "Semantic Scenes Detection and Classification in Sports Videos", 16th IPPR Conference on Computer Vision and Image Processing (CVGIP 2003), Aug. 17-19, 2003, pp. 210-217.

PCT Search Report & Written Opinion, RE: Application #PCT/US2014/022147; dated Jul. 10, 2014.

Bo Han, et al., "Enhanced Sports Video Shot Boundary Detection Based on Middle Level Features and a Unified Model", IEEE Transactions on Consumer Electronics, vol. 53, No. 3, Aug. 1, 2007.

\* cited by examiner

Exemplary Python Code:

```
# classify image as long-shot or not long-shot based on hue & value
if bin_mean_otsu > lowerLongShotThresh and bin_mean_otsu < upperLongShotThresh:
    # field color test, use forgiving thresholds
    if bin_std_otsu < stdHueThresh or bin_std_range < stdHueThresh:
        # field color uniformity test, also use forgiving thresholds
        if bin_mean_hue < int(t_hue):  # primary criteria
            longShot = True
```

210 — # classify image as long-shot or not long-shot based on hue & value / if bin_mean_otsu > lowerLongShotThresh and bin_mean_otsu < upperLongShotThresh:
216 — # field color test, use forgiving thresholds / if bin_std_otsu < stdHueThresh or bin_std_range < stdHueThresh:
206 — # field color uniformity test, also use forgiving thresholds
218 — if bin_mean_hue < int(t_hue): # primary criteria / longShot = True

DETECTION OF LONG SHOTS IN SPORTS VIDEO

BACKGROUND

1. Technical Field

The present disclosure relates to the field of digital video analysis and encoding, particularly a method of detecting long shots in sports video.

2. Background

Watching sports video is a popular pastime for many people. Digital transmissions of sports video can be viewed on televisions directly or through set-top boxes, or on other devices such as personal computers, tablet computers, smartphones, mobile devices, gaming consoles, and/or other equipment. Digital recordings of sports video can be viewed on the same devices and viewing the digital recordings can begin at the start of a recorded event or midway through the event.

Automatic parsing of sports video based on visual and/or cinematographic cues can be used to identify segments of potential interest to a viewer, and/or points at which video on demand playback can begin. Visual cues, such as long shots, medium shots and close up shots, can be used to identify segments of the video where on-field events are occurring, or to distinguish on-field events from close up views of players, referees, balls, logos, or other items. Long shots frequently provide coverage of large areas of a playing surface, such as a playing field or court, and frequently identify periods of time during which activity on the field is at a maximum. Extended periods of play can comprise a sequence of long shots followed by medium and/or close up shots which signify the end of a play or highlight the contributions of key players. Detection of long shots can also aid in automatically identifying highlights from the video, and/or automatically summarizing video.

Some methods of detecting long shots have been developed. However, most existing methods require training time and cannot immediately identify long shots based on a single frame of video. For example, some methods create hue histograms from randomly selected frames over a period of time, and then identify peaks and thresholds from the histogram. These methods require time for their model to be trained at the beginning of a sports video, and the training can be impeded when non-sports video is interspersed with the sports video, such as commercials or pre-game analysis, or if portions of the field are covered with statistics, logos or other graphics. In other methods, the color of a playing surface is learned at the beginning of a sports video, but the method can need time to learn the color of the playing surface before the long shot detection algorithm can begin. In still other methods, the color of the playing surface must be preidentified, and/or compares the color of the playing surface to a reference model.

SUMMARY

What is needed is a method for detecting long shots in sports video that can operate on a single frame without needing analysis of multiple frames over a period of time, or needing prior information about the color of a playing surface. The present disclosure provides a method for a device receiving a video frame to determine whether the frame is a long shot by dividing the video frame into candidate field pixels and candidate non-field pixels, determining whether enough pixels are candidate field pixels, determining whether the hue of those candidate field pixels is within a typical range, and whether one or more standard deviations are small enough to confirm that the candidate field pixels have a consistent hue.

In one embodiment, the present disclosure includes a method of identifying long shots of sports video is provided, the method comprising receiving a video frame comprising a plurality of pixels, classifying each of the plurality of pixels as a candidate field pixel or a candidate non-field pixel, determining whether at least a predefined percentage of the plurality of pixels are candidate field pixels, calculating a first standard deviation, the first standard deviation being the standard deviation of the hues of all candidate field pixels, and classifying the video frame as a long shot of sports video when at least the predefined percentage of the plurality of pixels are candidate field pixels and the first standard deviation is equal to or lower than a predefined maximum standard deviation value.

In another embodiment, the present invention includes a system, the system comprising a memory configured to receive and store a video frame comprising a plurality of pixels, and a processor configured to classify each of the plurality of pixels as a candidate field pixel or a candidate non-field pixel, determine whether at least a predefined percentage of the plurality of pixels are candidate field pixels, calculate a first standard deviation, the first standard deviation being the standard deviation of the hues of all candidate field pixels, classify the video frame as a long shot of sports video when at least the predefined percentage of the plurality of pixels are candidate field pixels and the first standard deviation is equal to or lower than a predefined maximum standard deviation value.

BRIEF DESCRIPTION OF THE DRAWINGS

Further details of the present invention are explained with the help of the attached drawings in which.

DETAILED DESCRIPTION

Figure 1:
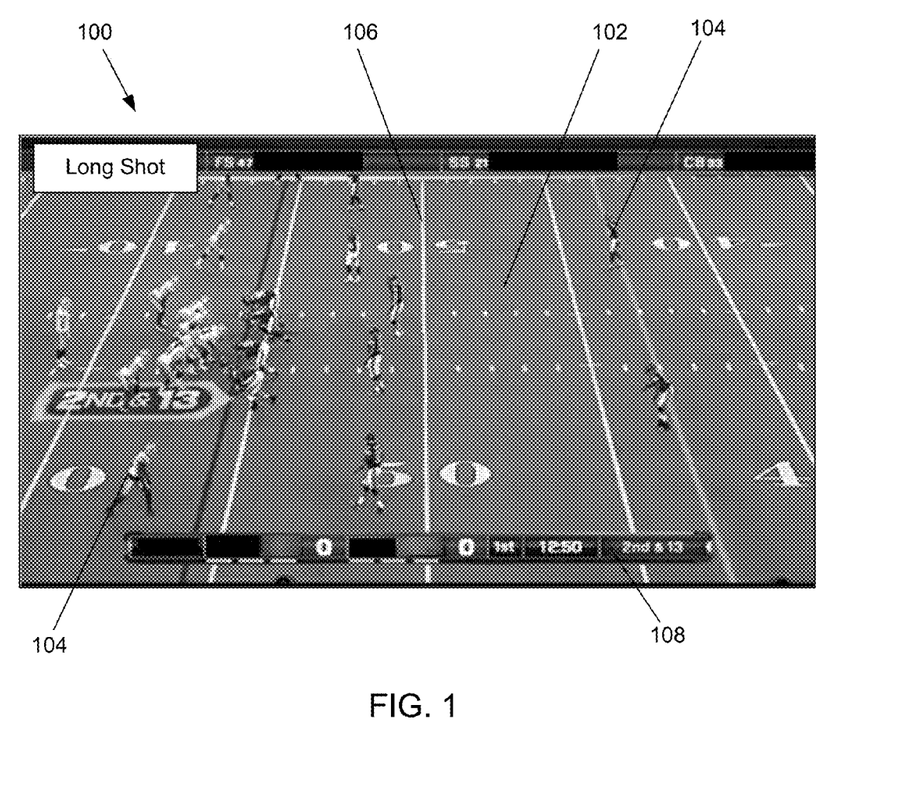
FIG. 1 depicts an exemplary frame of a long shot of sports video.

FIG. 1 depicts an exemplary frame 100 of a long shot in sports video. A video frame 100 can comprise a plurality of pixels. By way of a non-limiting example, in some 1080p high definition videos, each frame 100 can comprise 1920 pixels by 1080 pixels. Long shots can be shots of one or more subjects that are taken at a distance and/or have a wide field of view. In sports video, long shots generally show a portion of a playing surface 102, as shown in FIG. 1. In some sports, the playing surface 102 can be a field, such as in football, baseball, and soccer. In other sports, the playing surface 102 can be a court, such as in basketball or tennis. In still other sports, the playing surface 102 can be an ice rink, such as in ice hockey, or other type of playing surface. Playing surfaces 102 can be made of grass, turf, wood, ice, cement, clay, sand, any other type of surface. Regardless of the specific sport, most playing surfaces 102 have large areas of uniform or near uniform color. By way of non-limiting examples, in football most fields are made of grass or turf that is predominantly green, while in basketball many courts are made of hardwood that is predominantly tan. Moreover, in some embodiments and/or situations, large playing surfaces 102 can be more or less bright than surrounding areas. By way of a non-limiting example, the court surface in a basketball video can be illuminated with much higher intensity lights than the areas immediately adjacent to the court.

As can be seen from FIG. 1, in long shots the playing surface 102 can be at least partially obscured by offensive and/or defensive players 104, referees, balls, lines 106, logos, on-screen displays 108, or other items. In some long shots other elements or backgrounds can be visible, such as fans, stands, sidelines, portions of a stadium, or other items. Even though other items can be visible in the frame 100, in most long shots the uniform or near uniform color of the playing surface 102 can still fill a significant portion of the frame, as shown in FIG. 1. When long shots can be identified in sports video, this information can be used to influence the operations of video processing equipment that includes video encoders and/or transcoders. For example, in some embodiments a video encoder can modify its operating parameters such as quantization step size, coding unit size, transform unit size and macro-block modes based on the presence of a long shot being signaled. In some embodiments, video encoding can be optimized because most playing surfaces 110 have a uniform or near uniform color, and therefore have less detail than other areas of the image such as the players, fans, or backgrounds other than the playing surface 102. Additionally, video frames classified as long shots frequently contain areas of considerable interest, such as the play field and active participants in the events, adjacent to areas of much less interest to most viewers, such as fans in the stands.

In some embodiments, a video preprocessing system communicatively coupled with the input of a video encoder can perform media analysis and content classification on behalf of the encoder, allowing the encoder to devote less time and fewer bits to encoding the portions of the frame 100 devoted to the uniform or near uniform playing surface 102 and regions outside the playing surface 102, and more encoding time and effort can be devoted to areas of the image that have more detail and relevance to a viewer.

Figure 2:
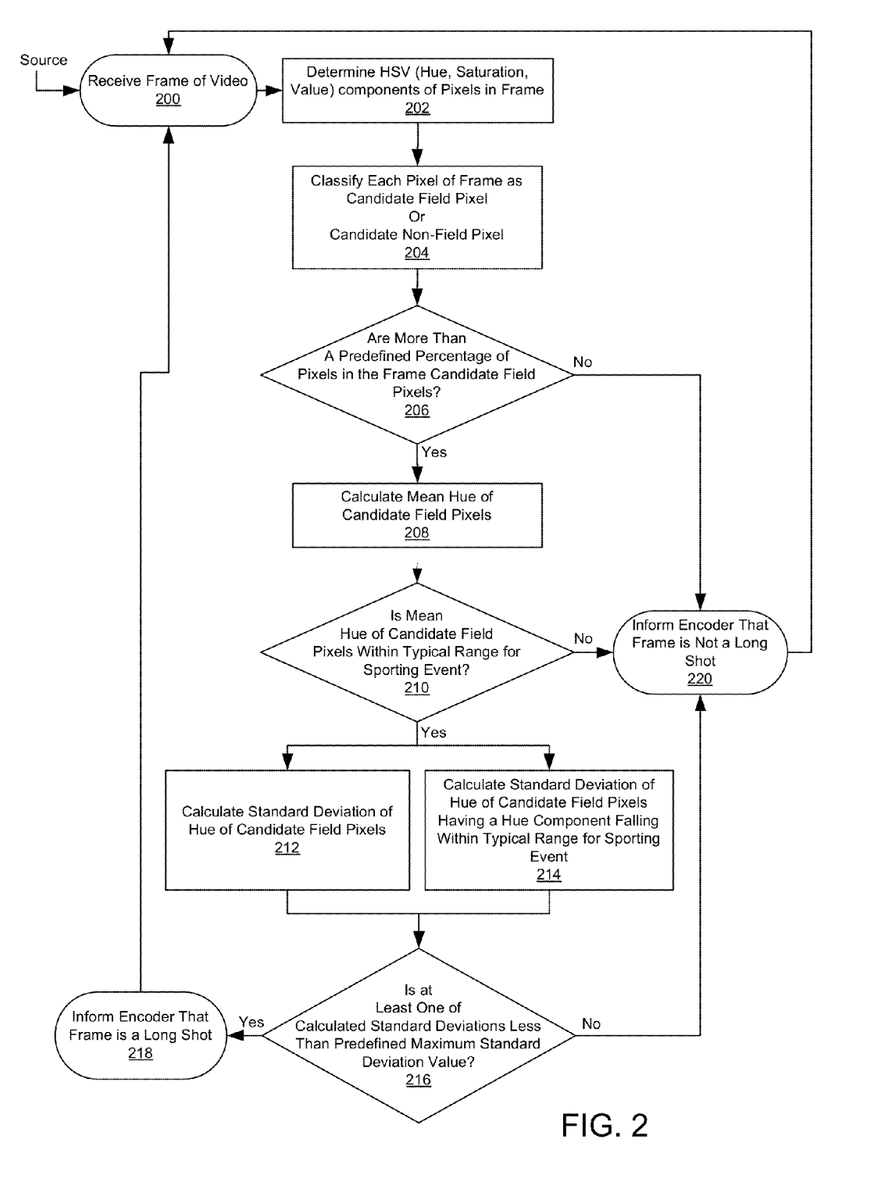
FIG. 2 depicts a method for determining whether a frame is a long shot of sports video.

FIG. 2 depicts a method for determining long shots in sports video. The method of FIG. 2 can find that a frame 100 is a long shot when the hues of its pixels have a bimodal distribution biased toward hues that are typical for the playing surface 102 of the sporting event, and also have a tight standard deviation around a hue typical for the playing surface 102.

At step 200, a media analysis system can receive a video frame 100 comprising a plurality of pixels. The system can be a video preprocessing system, video processor, encoder, server, computer, or any other piece of equipment that can receive and analyze video frames 100.

The video frame 100 can be received from a source, such as a video decoder, camera, media server, receiver, or any other type of television or video transmission equipment capable of transporting uncompressed and/or compressed video signals. By way of a non-limiting example, in some embodiments the video frame 100 can be received from a video decoder that takes a compressed video signal received on a local area network or from the output of a satellite, terrestrial, or cable television receiver and expands it into an uncompressed component video signal, such as a RGB (Red, Green, Blue) signal.

At step 202, the system can determine the HSV (Hue, Saturation, and Value) components of each pixel in the frame 100. The HSV components of a pixel can together describe the color of the pixel. The hue component can describe the pixel's hue or tint. The saturation component can describe the pixel's saturation or amount of gray. The value component can describe the pixel's brightness or color intensity. In some embodiments, the color of the pixels can initially be described with the RGB (Red, Green, Blue) color model, and the RGB values can be converted into HSV values.

At step 204, each pixel of the frame can be classified as a candidate field pixel 110 or a candidate non-field pixel 112. In some embodiments, a hue component threshold 114 can be determined, and the system can classify all pixels having a hue component below the hue component threshold 114 as a candidate field pixel 110, and all pixels having a hue component above the hue component threshold 114 as a candidate non-field pixel 112. Division of the pixels at a hue component threshold 100 can be appropriate as a step to determine long shots because the hues of the frames 100 of long shots generally have bimodal distributions, while the hues of the frames 100 of close up shots and/or medium shots generally do not have bimodal distributions.

In some embodiments, the hue component threshold 114 can be determined using an image thresholding method. In some embodiments, a histogram-based image thresholding method can be used, in which a histogram 116 of the hue components of all pixels in the frame 100 is generated and the histogram 116 is divided into two sections, the candidate field pixels 110 and the candidate non-field pixels 112, at the hue component threshold 114. By way of a non-limiting example, in some embodiments the hue component threshold 114 can be determined using Otsu's method, in which the hue component threshold 114 can be determined to be the hue level on the histogram 116 at which the combined spread of the hue components of the pixels on either side of the hue component threshold 114 is at its minimum. In alternate embodiments, the hue component threshold 114 can be determined using clustering-based methods, entropy-based methods, object attribute-based methods, spatial methods, local methods, and/or any other desired image thresholding method.

In alternate embodiments, a value component threshold can be determined in addition to the hue component threshold 114 and the system can classify all pixels having a hue component below the hue component threshold 114 and above the value component threshold as a candidate field pixel 110, and all pixels having either a hue component above the hue component threshold 114 or a value component below the value component threshold as a candidate non-field pixel 112. Division of the pixels at the value component threshold can be appropriate as a step to determine long shots because the values of the frames 100 of long shots often have bimodal distributions in both the hue and the value components, for example when the playing surface 102 is illuminated by stadium lights to a greater extent than surrounding areas, while the hue and value components of the frames 100 of close up shots and/or medium shots generally do not have highly correlated bimodal distributions.

In some embodiments, the value component threshold can be determined using an image thresholding method similar to the determination of the hue component threshold 114. In some embodiments, a histogram-based image thresholding method can be used, in which a histogram 116 of the value components of all pixels in the frame 100 is generated and the histogram 116 is divided into two sections, the candidate field pixels 110 and the candidate non-field pixels 112, at the value component threshold. By way of a non-limiting example, in some embodiments the value component threshold can be determined using Otsu's method, in which the value component threshold can be determined to be the value level on the histogram 116 at which the combined spread of the value components of the pixels on either side of the value component threshold is at its minimum. In alternate embodiments, the value component threshold can be determined using clustering-based methods, entropy-based methods, object attribute-based methods, spatial methods, local methods, and/or any other desired image thresholding method.

The classification of pixels as candidate field pixels 110 and candidate non-field pixels 112 based on the hue component threshold 114 of a single frame 100 or both the hue component threshold 114 and the value component threshold of a single frame can allow the method of FIG. 2 to function regardless of the specific hues and/or values on the histogram 116, such that the method can be used with any type or color of playing surface 102, and any lighting or weather conditions. Because the method classifies the pixels of a single frame 100, the method does not require training time over multiple frames 100 and is not affected by changing lighting or weather conditions over multiple frames 100.

At step 206, the system can determine whether at least a predefined percentage of the pixels in a frame 100 are candidate field pixels 110. In some embodiments, the predefined percentage can be 50%, such that the system can determine whether the candidate field pixels 110 take up a majority of the frame 100. In alternate embodiments, the predefined percentage can be any desired percentage.

In some embodiments when the predefined percentage is 50%, the system at step 206 can determine whether the majority of the pixels in the frame 100 are candidate field pixels 110 by calculating a total mean hue 118, the mean hue of all the pixels in the frame 100. The system can compare the total mean hue 118 to the hue component threshold 114 determined in step 204. If the total mean hue 118 is above the hue component threshold 114, the system can determine that the majority of the pixels in the frame 100 are candidate field pixels 110.

If the system determines at step 206 that less than the predefined percentage of the pixels in the frame 100 are candidate field pixels 110, the system can determine that the frame 100 is not a long shot, and can move to step 220 to inform an encoder that the frame 100 is not a long shot and/or inform the encoder to encode the frame normally without considering the frame 100 to be a long shot. In some embodiments, the encoder can be a part of the system itself. In alternate embodiments, the encoder can be a separate component in communication with the system. If the system determines at step 206 that at least the predefined percentage of the pixels in the frame 100 are candidate field pixels 110, the system can move to step 208.

In some embodiments, at step 208 the system can calculate the field mean hue 120, the mean hue of the pixels in the frame 100 that were determined to be candidate field pixels 110 in step 204. The mean field hue 120 can be obtained by averaging the hue components of the candidate field pixels 110.

In some embodiments, at step 210 the system can determine whether the field mean hue 120 of the candidate field pixels 110 is within a predefined range of values. In some embodiments, the predefined range of values can be a range of values for the hue component that are typical for the playing surface 102 of the particular sporting event and/or venue being shown in the video. The playing surfaces 102 of different sports and/or specific venues can have different typical ranges of hue components. By way of a non-limiting example, a grass football field can have a typical range of hue components describing green hues.

In alternate embodiments, steps 208 and 210 can be absent, such that the field mean hue 120 of the candidate field pixels 110 is not determined and is not compared to a predefined range of values. In these alternate embodiments, the system can move directly to steps 212 and/or 214 if the system determined during step 206 that at least the predefined percentage of the pixels in a frame 100 were candidate field pixels 110.

If the system determines at step 210 that the field mean hue 120 is not within the predefined range of values, the system can determine that the frame 100 is not a long shot, and can move to step 220 to inform the encoder that the frame 100 is not a long shot and/or inform the encoder to encode the frame normally without considering the frame 100 to be a long shot. If the system determines at step 210 that the field mean hue 120 is within the predefined range of values, the system can move to steps 212 and/or 214.

At step 212, the system can calculate a first standard deviation 122, the standard deviation of the hue components of all of the candidate field pixels 110 in the frame 100. In some embodiments, at step 214, the system can also calculate a second standard deviation 124, the standard deviation of the hue components of the subset of candidate field pixels 110 that have hue components that fall within a predefined range of values. As discussed above, in some embodiments the predefined range of values can be the range of values for the hue component that are typical for the playing surface 102 of the particular sporting event and/or venue being shown in the video. In alternate embodiments, step 214 can be absent, such that only the first standard deviation 122 is calculated at step 212.

In some embodiments, the field mean hue 120, the first standard deviation 122 and/or the second standard deviation 124 can be calculated directly from the histogram 116. The field mean hue 120 can be calculated from hue histogram values that are less than the hue component threshold 114. By way of a non-limiting example, the field mean hue 120 can equal a first histogram sum divided by a second histogram sum, such that the first histogram sum equals the sum of the product of each hue value that is less than the hue component threshold 114 multiplied by its histogram value, and such that the second histogram sum equals the sum of histogram values that have a hue less than the hue component threshold 114. Similarly, a field mean square hue can be calculated by dividing a third histogram sum by the second histogram sum, such that the third histogram sum equals the sum of the product of each hue value that is less than the hue component threshold 114 multiplied by its histogram value squared. The first standard deviation 122 can be calculated from the field mean hue and the field mean square hue by taking the square root of the sum of the field mean square hue minus the field mean hue squared. The second standard deviation 124 can be calculated from a predefined range mean hue and a predefined mean square hue using the same technique used for the first standard deviation 122 calculation, except that the predefined range mean hue and the predefined range mean square hue are computed from histogram values within the bounds of a predefined range instead of from histogram values less than the hue component threshold 114. As discussed above, the predefined range of values can be a range of values for the hue component that are typical for the playing surface 102 of the particular sporting event and/or venue being shown in the video. In some situations and/or embodiments in which the number of candidate field pixels 110 is larger than the number of hue values, calculating the mean hue and standard deviation values from the hue histogram 116 can be computationally more efficient than calculating these values directly than from candidate field pixels 110.

In some embodiments at step 216, the system can determine whether at least one of the first standard deviation 122 and the second standard deviation 124 that were calculated in steps 212 and 214 are equal to or lower than a predefined maximum standard deviation value. In some embodiments, the predefined maximum standard deviation value can be selected such that when at least one of the first standard deviation 122 and the second standard deviation 124 is lower than the predefined maximum standard deviation value, the system can have detected candidate field pixels 110 that represent a playing surface 102 that are unified by a dominant overall hue. In some situations and/or embodiments, the playing surface 102 can have secondary playfield features that have one or more colors that are different than the dominant overall hue, such that the different colors can stand out to television and live audiences and/or designate different portions of the playing surface 102 for players and game officials. By way of non-limiting examples, in some basketball courts the key areas underneath the basket can be a different color than the rest of the court, and in some football fields the end zone area can be a different color than the rest of the field. In some embodiments, the second standard deviation 124, which is calculated over a limited range of hues, can be used to isolate the dominant overall hue of the playing surface 102 from secondary playfield features that have different colors.

In alternate embodiments, at step 216 the system can determine whether the first standard deviation 122 that was calculated in step 212 is equal to or lower than the predefined maximum standard deviation value without considering the second standard deviation 124, for example in embodiments in which step 214 is absent.

If the system determines at step 216 that neither of the first standard deviation 122 and the second standard deviation 124 is equal to or lower than the predefined maximum standard deviation value, the system can determine that the frame 100 is not a long shot, and can move to step 220 to inform the encoder that the frame 100 is not a long shot and/or inform the encoder to encode the frame normally without considering the frame 100 to be a long shot. If the system determines at step 210 that one or both of the first standard deviation 122 and the second standard deviation 124 is equal to or lower than the predefined maximum standard deviation value, the system can determine that the frame 100 is a long shot and can move to step 218 to inform the encoder that the frame 100 is a long shot. In some embodiments, at step 218 the system can also inform the encoder which pixels in the long shot frame 100 were determined to be candidate field pixels 110.

Figure 3:
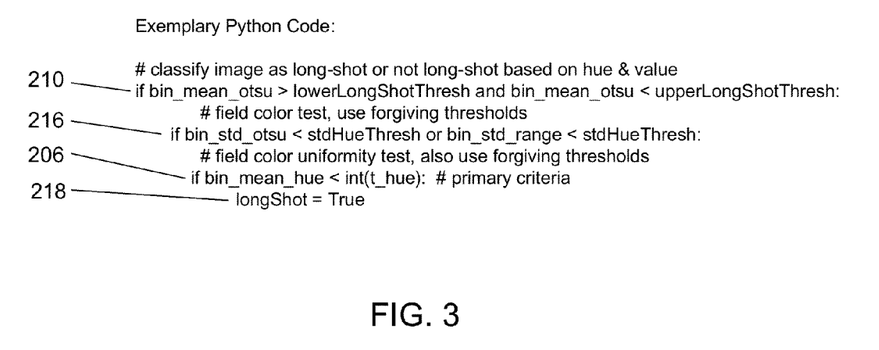
FIG. 3 depicts exemplary code that can implement steps of the method shown in FIG. 2.

After the system has informed the encoder that the frame 100 is a long shot at 218, or has informed the encoder that the frame 100 is not a long shot or should be encoded with normal encoding without considering the frame 100 to be a long shot at step 220, the system can return to step 200 to receive the next frame 100 in the video from the source. FIG. 3 depicts a non-limiting exemplary embodiment of Python code that can be used to implement to process depicted in FIG. 2. In FIG. 3, step 210 can be implemented using the variables "bin_mean_otsu," which can be the mean field hue 120, and "lowerLongShotThresh" and "upperLongShotThresh," which can be the lower and upper bounds of a predefined range of values, for example the range of values for the hue component typical for the playing surface 102 of the particular sporting event and/or specific venue being shown in the video. Step 216 can be implemented in FIG. 3 using the variables "bin_std_otsu," which can be the first standard deviation 122, "bin_std_range," which can be the second standard deviation 124, and "stdHueThresh," which can be the predefined maximum standard deviation value. Step 206 can be implemented in FIG. 3 using the variables "bin_mean_hue," which can be the total mean hue 118, and "int(t_hue)," which can be the hue component threshold 114. Step 218, the step of informing the encoder that the frame 100 is a long shot, can be indicated by setting "longShot" to "true." It should be noted that in the embodiments of the method shown in FIG. 2, FIG. 3, or any other embodiment, the tests of steps 206, 210, and/or 216 can be performed in any order.

FIGS. 4A-7B depict examples of video frames 100 and their associated histograms 116. Each exemplary histogram 116 depicts the frame's hue component threshold 114, total mean hue 118, field mean hue 120, first standard deviation 122, and second standard deviation 124.

Figure 4A:
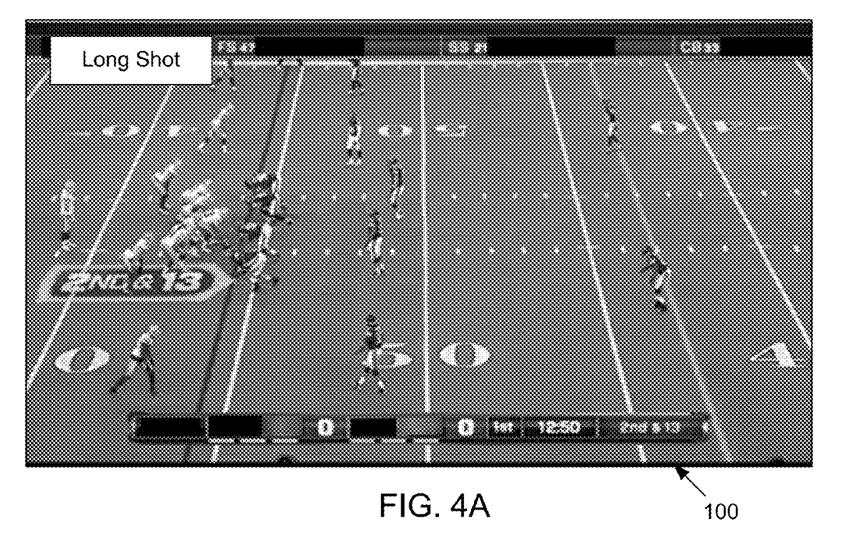
FIG. 4A depicts an exemplary frame of a long shot of sports video.
Figure 4B:
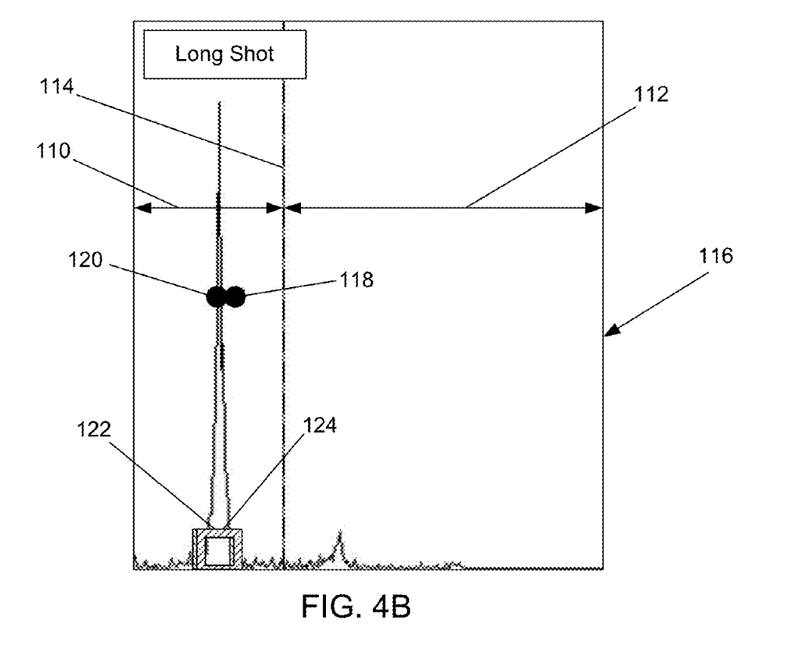
FIG. 4B depicts a histogram of the hues of the frame shown in FIG. 4A.

FIG. 4A depicts an exemplary frame 100 showing a long shot of a football game taken from a high angle. The method of FIG. 2 can determine that the frame 100 shown in FIG. 4A is a long shot of sports video. As can be seen from the histogram of FIG. 4B, the system at step 204 can determine the hue component threshold 110 and divide the pixels having hue components greater than the hue component threshold 110 as candidate non-field pixels and the pixels having hue components less than the hue component threshold 110 as candidate field pixels. The system at step 206 can determine that a majority of the pixels are candidate field pixels because the total mean hue 112 is less than the hue component threshold 110. The system at step 210 can find that the field mean hue 114 is within the typical range for the sporting event. The system at step 216 can find that both the first standard deviation 116 and the second standard deviation are less than the predefined maximum standard deviation value. Because the frame 100 passes the mean tests of steps 206 and 210, and the standard deviation test of step 216, the frame 100 of FIG. 4A can be determined to be a long shot of sports video.

Figure 5A:
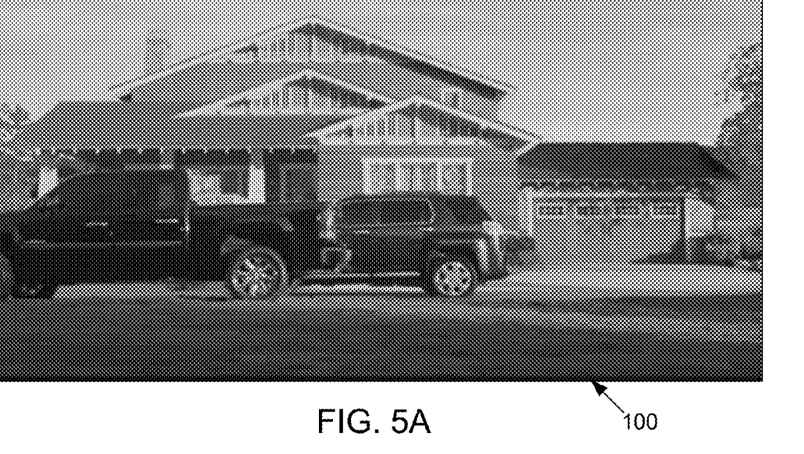
FIG. 5A depicts an exemplary frame of a long shot of sports video.
Figure 5B:
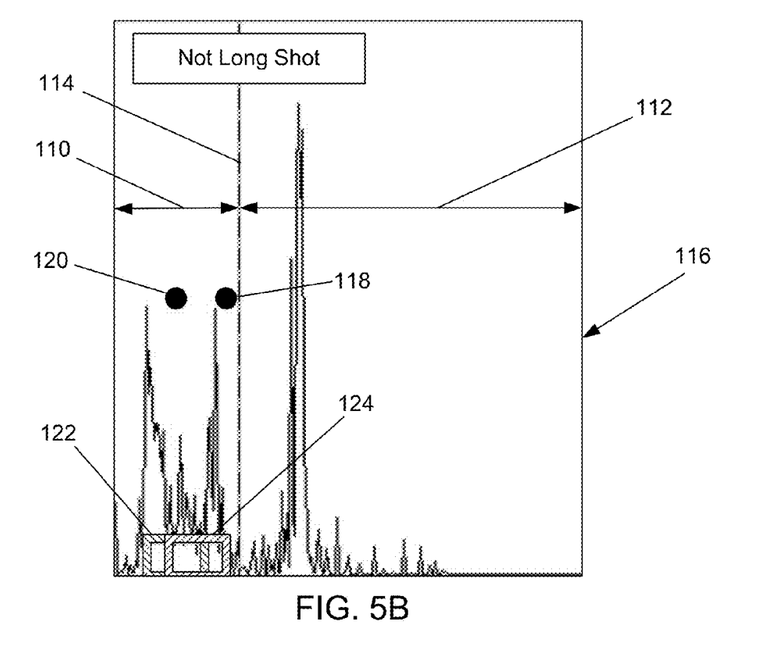
FIG. 5B depicts a histogram of the hues of the frame shown in FIG. 5A.

FIG. 5A depicts an exemplary frame 100 showing a long shot of vehicles in front of a house, near a green lawn. Although the green lawn has many of the same hues as a green football field, the method of FIG. 2 can determine that the frame 100 shown in FIG. 5A is not a long shot of sports video. As can be seen from the histogram of FIG. 5B, the system at step 204 can determine the hue component threshold 110 and divide the pixels having hue components greater than the hue component threshold 110 as candidate non-field pixels and the pixels having hue components less than the hue component threshold 110 as candidate field pixels. The system at step 206 can determine that a majority of the pixels are candidate field pixels because the total mean hue 112 is less than the hue component threshold 110. The system at step 210 can find that the field mean hue 114 is within the typical range for the sporting event, even though that sporting event is not shown in the frame 100. However, the system at step 216 can find that neither of the first standard deviation 116 and the second standard deviation are less than the predefined maximum standard deviation value. Although the frame 100 passes the mean tests of steps 206 and 210, the frame 100 fails the standard deviation test of step 216 and therefore the frame 100 of FIG. 5A can be determined to not be a long shot of sports video.

Figure 6A:
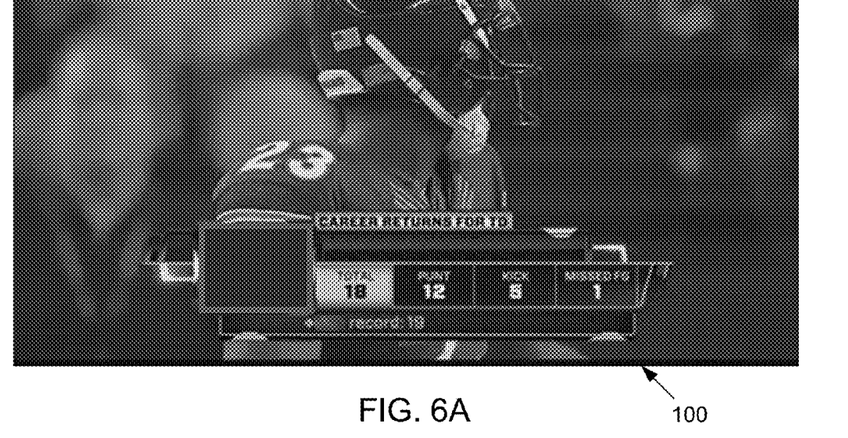
FIG. 6A depicts an exemplary frame of a long shot of sports video.
Figure 6B:
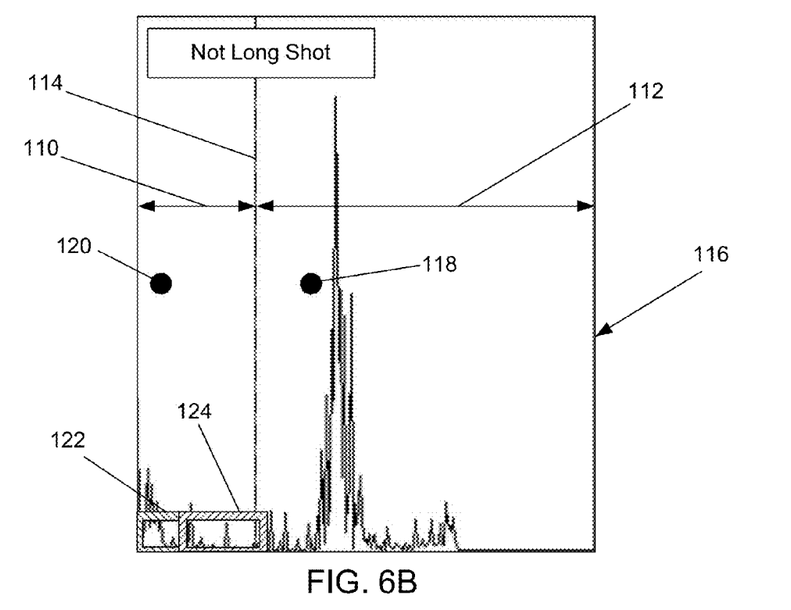
FIG. 6B depicts a histogram of the hues of the frame shown in FIG. 6A.

FIG. 6A depicts an exemplary frame 100 showing a close-up shot of a football player. Although the frame 100 shows the sport of football, the method of FIG. 2 can determine that the frame 100 shown in FIG. 6A is not a long shot of sports video. As can be seen from the histogram of FIG. 6B, the system at step 204 can determine the hue component threshold 110 and divide the pixels having hue components greater than the hue component threshold 110 as candidate non-field pixels and the pixels having hue components less than the hue component threshold 110 as candidate field pixels. The system at step 206 can determine that less than a majority of the pixels are candidate field pixels because the total mean hue 112 is greater than the hue component threshold 110. The system could inform the encoder that the frame 100 has been determined to not be a long shot at this point, however if the process were to continue the system at step 210 can also find that the field mean hue 114 is not within the typical range for the sporting event. The system could also inform the encoder that the frame 100 has been determined to not be a long shot at this point. However, if the process were to continue even further, the system at step 216 can also find that neither of the first standard deviation 116 and the second standard deviation are less than the predefined maximum standard deviation value. Because the frame 100 fails the mean tests of steps 206 and 210, and also fails the standard deviation test of step 216, the frame 100 of FIG. 6A can be determined to not be a long shot of sports video.

Figure 7A:
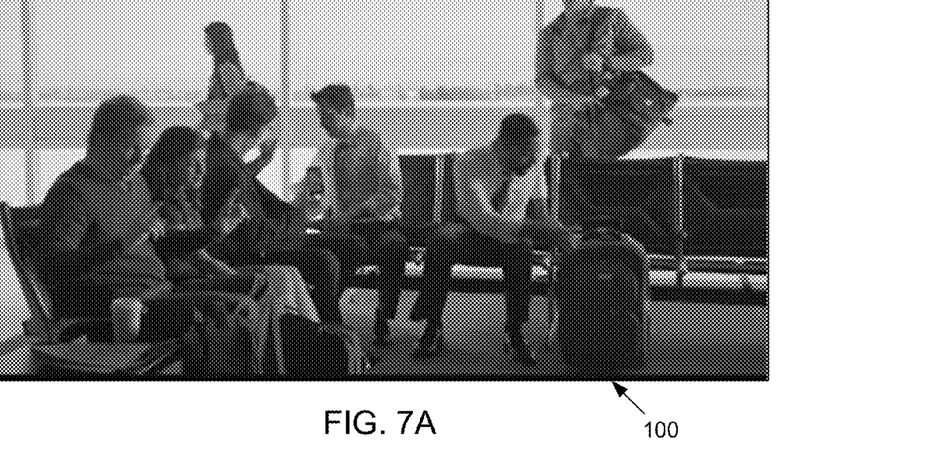
FIG. 7A depicts an exemplary frame of a long shot of sports video.
Figure 7B:
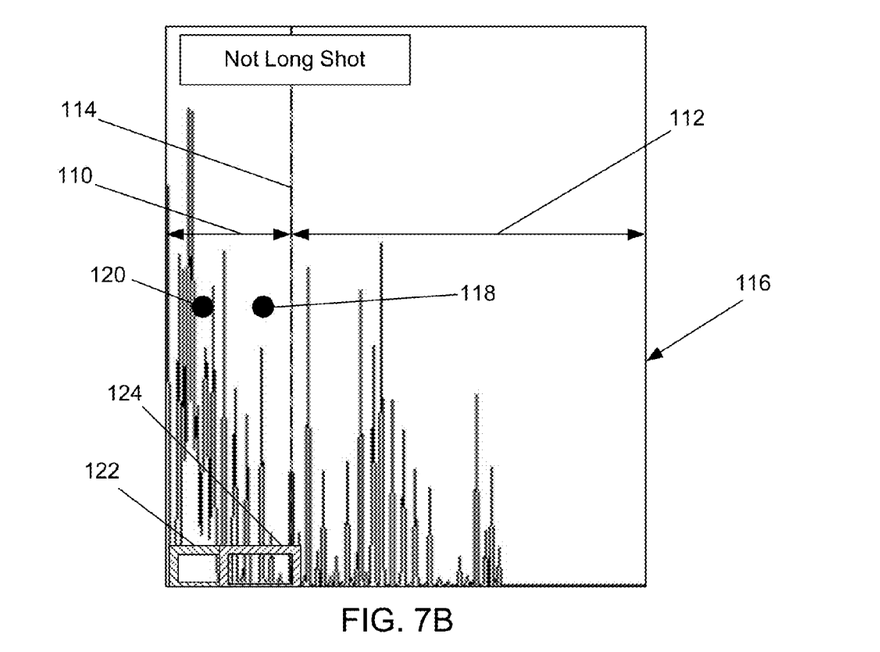
FIG. 7B depicts a histogram of the hues of the frame shown in FIG. 7A.

FIG. 7A depicts an exemplary frame 100 showing a medium shot of travelers waiting at an airport. The method of FIG. 2 can determine that the frame 100 shown in FIG. 7A is not a long shot of sports video. As can be seen from the histogram of FIG. 7B, the system at step 204 can determine the hue component threshold 110 and divide the pixels having hue components greater than the hue component threshold 110 as candidate non-field pixels and the pixels having hue components less than the hue component threshold 110 as candidate field pixels. The system at step 206 can determine that a majority of the pixels are candidate field pixels because the total mean hue 112 is less than the hue component threshold 110. However, the system at step 210 can find that the field mean hue 114 is not within the typical range for the sporting event. The system could inform the encoder that the frame 100 has been determined to not be a long shot at this point, however if the process were to continue the system at step 216 can also find that neither of the first standard deviation 116 and the second standard deviation are less than the predefined maximum standard deviation value. Although the frame 100 passes the mean test of steps 206, the frame 100 fails the mean test of step 210 and also fails the standard deviation test of step 216 and therefore the frame 100 of FIG. 7A can be determined to not be a long shot of sports video.

Figure 8:
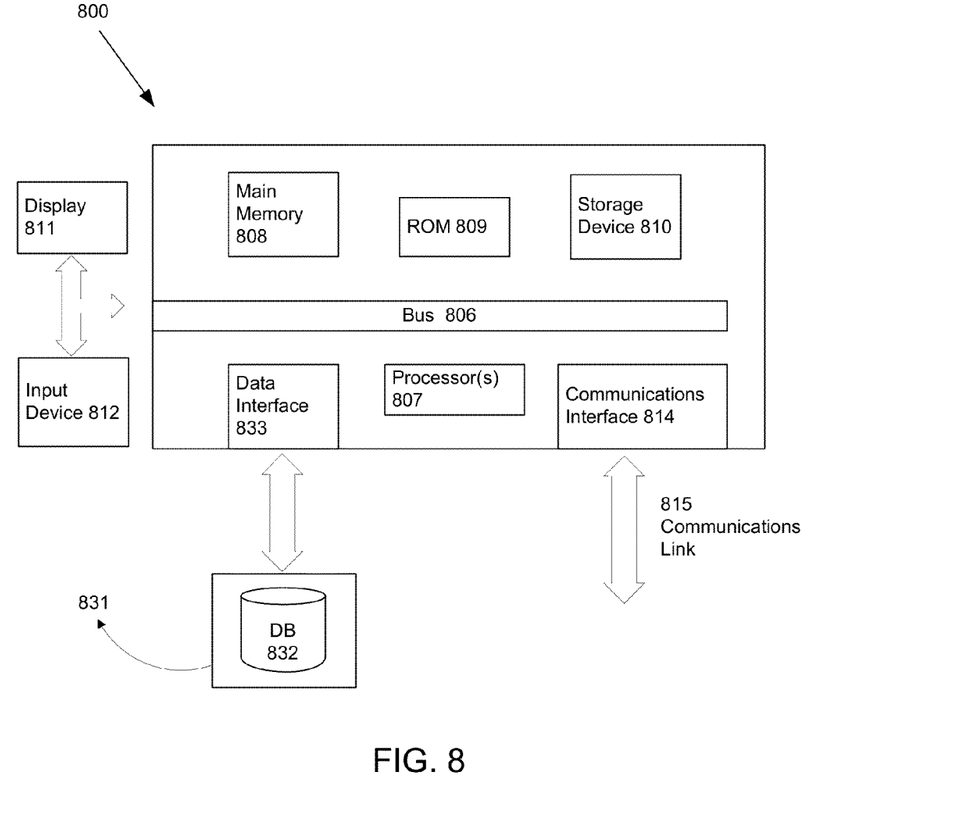
FIG. 8 depicts an exemplary embodiment of computer hardware that can perform the disclosed embodiments and methods.

The execution of the sequences of instructions required to practice the embodiments may be performed by a computer system 800 as shown in FIG. 8. In an embodiment, execution of the sequences of instructions is performed by a single computer system 800. According to other embodiments, two or more computer systems 800 coupled by a communication link 815 may perform the sequence of instructions in coordination with one another. Although a description of only one computer system 800 may be presented herein, it should be understood that any number of computer systems 800 may be employed.

A computer system 800 according to an embodiment will now be described with reference to FIG. 8, which is a block diagram of the functional components of a computer system 800. As used herein, the term computer system 800 is broadly used to describe any computing device that can store and independently run one or more programs.

The computer system 800 may include a communication interface 814 coupled to the bus 806. The communication interface 814 provides two-way communication between computer systems 800. The communication interface 814 of a respective computer system 800 transmits and receives electrical, electromagnetic or optical signals, that include data streams representing various types of signal information, e.g., instructions, messages and data. A communication link 815 links one computer system 800 with another computer system 800. For example, the communication link 815 may be a LAN, an integrated services digital network (ISDN) card, a modem, or the Internet.

A computer system 800 may transmit and receive messages, data, and instructions, including programs, i.e., application, code, through its respective communication link 815 and communication interface 814. Received program code may be executed by the respective processor(s) 807 as it is received, and/or stored in the storage device 810, or other associated non-volatile media, for later execution.

In an embodiment, the computer system 800 operates in conjunction with a data storage system 831, e.g., a data storage system 831 that contains a database 832 that is readily accessible by the computer system 800. The computer system 800 communicates with the data storage system 831 through a data interface 833.

Computer system 800 can include a bus 806 or other communication mechanism for communicating the instructions, messages and data, collectively, information, and one or more processors 807 coupled with the bus 806 for processing information. Computer system 800 also includes a main memory 808, such as a random access memory (RAM) or other dynamic storage device, coupled to the bus 806 for storing dynamic data and instructions to be executed by the processor(s) 807. The computer system 800 may further include a read only memory (ROM) 809 or other static storage device coupled to the bus 806 for storing static data and instructions for the processor(s) 807. A storage device 810, such as a magnetic disk or optical disk, may also be provided and coupled to the bus 806 for storing data and instructions for the processor(s) 807.

A computer system 800 may be coupled via the bus 806 to a display device 811, such as an LCD screen. An input device 812, e.g., alphanumeric and other keys, is coupled to the bus 806 for communicating information and command selections to the processor(s) 807.

According to one embodiment, an individual computer system 800 performs specific operations by their respective processor(s) 807 executing one or more sequences of one or more instructions contained in the main memory 808. Such instructions may be read into the main memory 808 from another computer-usable medium, such as the ROM 809 or the storage device 810. Execution of the sequences of instructions contained in the main memory 808 causes the processor(s) 807 to perform the processes described herein. In alternative embodiments, hard-wired circuitry may be used in place of or in combination with software instructions. Thus, embodiments are not limited to any specific combination of hardware circuitry and/or software.

Although the present invention has been described above with particularity, this was merely to teach one of ordinary skill in the art how to make and use the invention. Many additional modifications will fall within the scope of the invention, as that scope is defined by the following claims.

What is claimed:

1. A method of identifying long shots of sports video comprising:
   receiving a video frame comprising a plurality of pixels;
   classifying each of said plurality of pixels as a candidate field pixel or a candidate non-field pixel;
   determining whether at least a predefined percentage of said plurality of pixels are candidate field pixels;
   calculating a first standard deviation, the first standard deviation being the standard deviation of the hues of all candidate field pixels; and
   classifying said video frame as a long shot of sports video when at least said predefined percentage of said plurality of pixels are candidate field pixels and said first standard deviation is equal to or lower than a predefined maximum standard deviation value.

2. The method of claim 1, further comprising:
   calculating a field mean hue, said field mean hue being the average hue of all said candidate field pixels;
   determining whether said field mean hue is within a predefined range;
   calculating a second standard deviation, the second standard deviation being the standard deviation of the hues of the subset of candidate field pixels having hue components within said predefined range; and
   classifying said video frame as a long shot of sports video when at least said predefined percentage of said plurality of pixels are candidate field pixels and at least one of said first standard deviation and said second standard deviation are equal to or lower than said predefined maximum standard deviation value.

3. The method of claim 2, wherein the steps of calculating said first standard deviation, said field mean hue and said second standard deviation comprises generating a hue histogram of said video frame and calculating said first standard deviation, said field mean hue and said second standard deviation from said hue histogram.

4. The method of claim 1, wherein the classifying of each of said plurality of pixels as a candidate field pixel or a candidate non-field pixel comprises determining a hue component threshold, classifying each of said plurality of pixels that have hue components less than said hue component threshold as candidate field pixels; and classifying each of said plurality of pixels that have hue components greater than said hue component threshold as candidate non-field pixels.

5. The method of claim 2, wherein said hue component threshold is determined using Otsu's method.

6. The method of claim 4, wherein the classifying of each of said plurality of pixels as a candidate field pixel or a candidate non-field pixel further comprises determining a value component threshold, classifying each of said plurality of pixels that have value components greater than said value component threshold as candidate field pixels; and classifying each of said plurality of pixels that have value components greater than said value component threshold as candidate non-field pixels.

7. The method of claim 6, wherein said hue component threshold and said value component threshold is determined using Otsu's method.

8. The method of claim 1, wherein said predefined percentage is 50%.

9. The method of claim 8, wherein determining whether at least 50% of said plurality of pixels are candidate field pixels comprises determining whether a total mean hue is less than a hue component threshold, wherein said total mean hue is the mean hue of all of said plurality of pixels.

10. The method of claim 1, wherein said predefined range is a range of hue values typical for the playing surface of a sporting event.

11. The method of claim 1, further comprising informing an encoder that said video frame is not a long shot of sports video when more than said predefined percentage of said plurality of pixels are determined to be candidate non-field pixels.

12. The method of claim 1, further comprising informing an encoder that said video frame is not a long shot of sports video when the mean hue of all candidate field pixels is determined to be outside of said predefined range.

13. The method of claim 1, further comprising informing an encoder that said video frame is not a long shot of sports video when both of said first standard deviation and said second standard deviation are higher than said predefined maximum standard deviation value.

14. The method of claim 1, further comprising informing an encoder that said video frame is a long shot of sports video when at least one of said first standard deviation and said second standard deviation are equal to or lower than a predefined maximum standard deviation value.

15. The method of claim 1, further comprising calculating a third standard deviation, said third standard deviation being the standard deviation of the value components of candidate field pixels; comparing said third standard deviation to a predefined maximum; and determining that said frame is not a long shot when said third standard deviation is less than said predefined maximum.

16. A system, comprising:
    a memory configured to receive and store a video frame comprising a plurality of pixels; and
    a processor configured to:
      classify each of said plurality of pixels as a candidate field pixel or a candidate non-field pixel;
      determine whether at least a predefined percentage of said plurality of pixels are candidate field pixels;
      calculate a first standard deviation, the first standard deviation being the standard deviation of the hues of all candidate field pixels;
      classify said video frame as a long shot of sports video when at least said predefined percentage of said plurality of pixels are candidate field pixels and said first standard deviation is equal to or lower than a predefined maximum standard deviation value.

17. The system of claim 16, wherein said processor is further configured to:
    calculate a field mean hue, said field mean hue being the average hue of all said candidate field pixels;
    determine whether said field mean hue is within a predefined range;
    calculate a second standard deviation, the second standard deviation being the standard deviation of the hues of the subset of candidate field pixels having hue components within said predefined range; and
    classify said video frame as a long shot of sports video when at least said predefined percentage of said plurality of pixels are candidate field pixels and at least one of said first standard deviation and said second standard deviation are equal to or lower than said predefined maximum standard deviation value.

* * * * *